(12) United States Patent  
Lemke et al.

(10) Patent No.: US 6,824,726 B2  
(45) Date of Patent: Nov. 30, 2004

(54) COLD RUNNER SYSTEM FOR SANDWICH MOLDING

(75) Inventors: Theodore Lemke, Saukville, WI (US); John J. Hahn, Hartford, WI (US); Brian Hartlmeier, Elm Grove, WI (US); Loren Albrecht, Sheboygan, WI (US)

(73) Assignee: MGS Mfg. Group Inc., Germantown, WI (US)

( * ) Notice: Subject to any disclaimer, the term of this patent is extended or adjusted under 35 U.S.C. 154(b) by 211 days.

(21) Appl. No.: 10/179,609

(22) Filed: Jun. 24, 2002

(65) Prior Publication Data

US 2003/0234473 A1 Dec. 25, 2003

(51) Int. Cl.[7] .............................................. B29C 45/13
(52) U.S. Cl. ...................... 264/328.8; 425/130; 425/567
(58) Field of Search .............................. 264/328.8, 255; 425/130, 567, 573

(56) References Cited

U.S. PATENT DOCUMENTS

| | | | | |
|---|---|---|---|---|
| 3,888,612 A | * | 6/1975 | Schrewe et al. | 425/130 |
| 4,416,602 A | * | 11/1983 | Neumeister | 425/130 |
| 4,710,118 A | * | 12/1987 | Krishnakumar et al. | 425/130 |
| 4,752,199 A | * | 6/1988 | Arai | 425/130 |
| 4,994,220 A | * | 2/1991 | Gutjahr et al. | 264/328.8 |
| 6,562,275 B1 | * | 5/2003 | Martinez | 264/328.8 |

OTHER PUBLICATIONS

Rosato et al., Injection Molding Handbook, second edition, International Thomson Publishing, pp. 221–225.*

* cited by examiner

*Primary Examiner*—Jill L. Heitbrink  
(74) *Attorney, Agent, or Firm*—Quarles & Brady LLP

(57) ABSTRACT

A method of sandwich molding, in which a first thermoplastic material is injected into a mold cavity followed by the injection of a second thermoplastic material expanding within the first thermoplastic material, eliminates the need for heated runner systems communicating from the injection nozzle of the injection molding machine to the mold cavity by employing a cold runner having sufficiently slow solidification time to allow subsequent injections from two injection sources. The backflow into the inactive branch is prevented by maintaining the injection nozzle against the mold until molding is complete.

8 Claims, 1 Drawing Sheet

COLD RUNNER SYSTEM FOR SANDWICH MOLDING

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates generally to injection molding techniques and specifically to "sandwich" molding in which a second material expands within a first material within a mold cavity.

In conventional injection molding, a thermoplastic material is injected from an injection nozzle into a mold cavity formed by two or more mold portions. The thermoplastic material passes from the injection nozzle along a runner passage in the mold, through a gate (normally a constricted portion of the runner passage), and into the mold cavity.

When the thermoplastic material has cooled enough to solidify, the mold portions are separated and the molded part and a "runner" formed in the runner passage are ejected. The ejection process may break the runner from the molded part or this may be done in a separate "degating" step.

In sandwich injection molding, two materials are injected one after another into the mold cavity. By proper control of the injection process, the second material expands inside the first material so that the first material envelops the second material in a "sandwich". Sandwich molding is useful when different properties are required in the materials forming the center and outer surface of the molded part. For example, a recycled plastic material may be used in the center of the part while the outer surface may use a material having improved color, surface finish, and opacity.

In the molds for sandwich molding, the runner passage is normally heated to keep the first thermoplastic material from hardening and blocking the second thermoplastic material. The heating may be accomplished by use of a heated manifold joining streams from two injection nozzles to a common injection point on the mold or through a "hot runner system" being heated passageways built into the mold. The manifold or hot runner system may include valves in the runner passage to prevent backflow of the material into the branch not being used for injection of material. The heated runner or manifold prevents material from solidifying on the valves rendering them inoperable.

Using a hot runner system or heated manifolds significantly increases the cost of manufacturing a mold and may be impractical for low cost or short run sandwich molding projects.

BRIEF SUMMARY OF THE INVENTION

The present inventors have discovered that proper design of the runner passage can allow sandwich molding in which material is injected alternately in different branches of an unheated runner passage. The check valves that might be expected to clog if unheated are eliminated by holding the injection nozzles on each branch of the runner passage thereby creating sufficient pressure to prevent back flow to that runner branch. The result is a low cost mold that expands the availability of sandwich molding techniques.

More specifically, the present invention provides a method of sandwich molding comprising the steps of joining mold portions at a part line to define the mold cavity and a branched runner passage, the latter providing an unheated path connecting the mold cavity through a gate portion to a first and second branch exiting from a first and second opening in the mold. A first and second injection nozzle are abutted against the first and second openings, respectively, and a first thermoplastic material from the first injection nozzle is injected through a portion of the runner passage and gate to the mold cavity. Subsequently, a second thermoplastic material from the second injection nozzle is injected through a second branch of the runner passage and gate to the mold cavity to expand within the first thermoplastic material in the mold cavity. The first and second thermoplastic materials are allowed to solidify in the mold cavity and runner passage and the mold portions are opened and the molded part is separated from a runner formed in the runner passage.

It is thus a principal object of the invention to provide a simple molding technique for sandwich molding that does not require heated runners or the like.

The runner passage may extend along the part line or may have one branch extending along the part line and a second branch of the runner extending perpendicularly to the part line.

Thus, it is another object of the invention to provide simple variations for producing a branch runner passage consistent with extracting the solidified runner after the molds are separated.

The first injection nozzle may be maintained in position against the mold to block backflow of the second thermoplastic material from the first opening during the injection of the second thermoplastic material. Likewise, the second injection nozzle may be maintained and positioned against the mold to block backflow from the first thermoplastic material from the second opening when the first thermoplastic material is injected.

Thus, it is another object of the invention to eliminate the need for valves such as would necessitate a heated runner system.

The foregoing and other objects and advantages of the invention will appear from the following description. In this description, reference is made to the accompanying drawings, which form a part hereof, and in which there is shown by way of illustration, a preferred embodiment of the invention. Such embodiment and its particular objects and advantages do not define the scope of the invention, however, and reference must be made therefore to the claims for interpreting the scope of the invention.

DETAILED DESCRIPTION OF THE PREFERRED EMBODIMENTS

Figure 1:
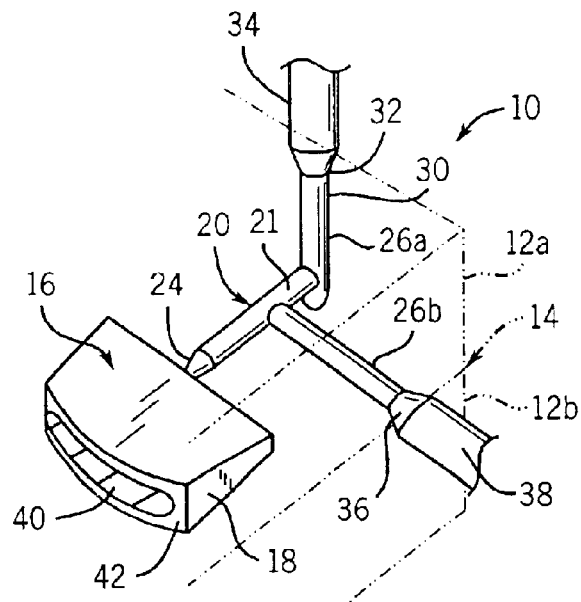
FIG. 1 is a perspective view of a molded part and runner shown positioned in a mold (in phantom), the runner having branches following a runner passage extending both along and across the mold part line according to a first embodiment of the invention, FIG. 1 also showing positioning of two injector nozzles during the molding process.

Referring now to FIG. 1, a mold 10 suitable for practice of the present invention is comprised of a first mold portion 12a interfitting with a second mold portion 12b along a part line 14. The first and second mold portions 12a and 12b together define an internal mold cavity 16 and a runner passage 20 containing respectively, (after molding), a molded part 18 and runner 22.

The runner passage 20 joins to the mold cavity 16 through a gate 24 being generally a constricted passage concentrating stress in the runner 22 at the gate portion to allow the runner 22 to be broken at the gate portion from the molded part 18 upon completion of the molding.

In the embodiment shown in FIG. 1, the runner passage 20 includes a common section 21 leading from the mold cavity 16 to first and second branch 26a and 26b with branch 26a extending perpendicularly from the part line 14 and common section 21 in a sprue portion 30 to a first opening 32 that may receive an injector nozzle 34. Branch 26b extends along the part line 14 perpendicularly to the branch 26a and common section 21 to a second opening 36 that may receive a second injector nozzle 38. When mold portions 12a and 12b are separated, the sprue portion 30, being tapered appropriately, may be removed from the mold portion 12a and the common section 21 and runner portion 26b are released by the division of the mold 10 along the part line 14.

The molded part 18 includes an outer portion comprised of the first thermoplastic material (outer material 42) injected from injector nozzle 34 and a second thermoplastic material (inner material 40) injected from injector nozzle 38 and expanding within the outer material 42. The enveloping is promoted by the sequential injection of both materials through a single gate 24 leading from the common section 21 and by control of the material volumes and velocities according techniques known in the art.

Figure 2:
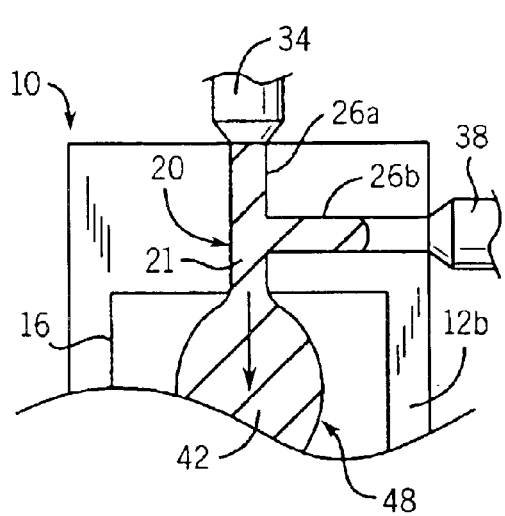
FIG. 2 is cross-sectional view of a second embodiment of a mold in which both branches of the runner passage extend along the part line, FIG. 2 also showing a first step of the molding process in which a first thermoplastic material is injected from a first injector nozzle through a first branch of the runner passage into the mold cavity, and backflow down the second branch of the runner passage is blocked by the second injector nozzle.

Referring now to FIG. 2 in a slightly different embodiment, both branches 26a and 26b may be extended in perpendicular orientations to each other but along the part line 14 of the mold 10 to receive thermoplastic material from repositioned injector nozzles 34 and 38. During the first step of the method of the present invention, injector nozzles 34 and 38 are positioned against the mold 10 with essentially zero injection pressure. The thermoplastic outer material 42 is then injected from injector nozzle 34 through branch 26a into mold cavity 16 where it forms a bolus 48 not filling the mold cavity 16. Some backpressure caused by the resistance to fill the mold cavity 16 will cause outer material 42 to flow along branch 26b toward injector nozzle 38 into the runner passage 26b. This flow is eventually stopped by injector nozzle 38 which is held tightly against the mold 10 to prevent leakage of outer material 42 out of mold 10.

Figure 3:
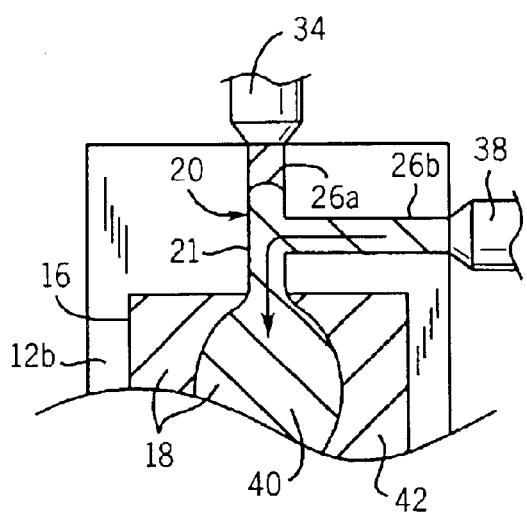
FIG. 3 is a figure similar to that of FIG. 2 showing a second step of the molding process in which a second thermoplastic material is injected from a second injector nozzle through a second branch of the runner passage into the mold cavity to expand within the first thermoplastic material, and backflow down the first branch of the runner passage is blocked by the first injector nozzle.

Referring now to FIG. 3 at a second step, injector nozzle 34 ceases injection and injector nozzle 38 begins injection of the inner material 40. This inner material 40 proceeds a short distance down branch 26a but is stopped ultimately by the pressure of injector nozzle 34 which is held against the mold 10. The inner material 40 then passes along branch 26b into mold cavity 16 expanding within the bolus 48 of the outer material 42. After the inner material 40 and outer material 42 have solidified sufficiently, the mold portions 12a (not shown) and 12b are separated and a runner 22 formed of the inner material 40 and outer material 42 and the molded part 18 (also formed of the inner material 40 and outer material 42) are removed from the mold 10.

The small diameter of the orifice from the injector nozzles 34 and 38 to the runner 22 and their high temperature allow easy separation of the runners 22 from the injector nozzles 34 and 38 when the latter are retracted. Removal of the runner 22 from the part 18 may be accomplished by standard degating practices well known in the art.

The present technique relies on the first injected outer material 42 maintaining sufficient plasticity in the runner passage 20 to remain mobile under the influence of inner material 40 from injector nozzle 38. This may be accomplished by controlling the length of the common section 21 of the runner passage 20 and the speed of the injection process. Normally this will mean keeping the length of the common section 21 relatively short. Note that it is required only that a portion of the outer material 42 in the runner passage 20 maintain plasticity so as to allow flow of inner material 40 and that some solidification of outer material 42 around the periphery of the runner may be acceptable.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of sandwich molding comprising the steps of:
    (1) joining mold portions at a part line, each mold portion defining both of a mold cavity and an unheated branched runner passage free from valves, the branched runner passage having a common section and a first and second separate section, the common section and at least one of the separate sections of the runner passage extend from the cavity to the outside of the mold portion entirely along the part line;
    (2) placing a first and second injection nozzle against the first and second separate sections of the branched runner passage, respectively;
    (3) injecting a first thermoplastic material from the first injection nozzle through the first separate section of the runner passage to partially fill the mold cavity;
    (4) injecting a second thermoplastic material from the second injection nozzle through the second separate portion of the runner passage to expand within the first thermoplastic material so that the second thermoplastic material is substantially wholly enveloped by the first thermoplastic material, the first and second thermoplastic materials completely filling the mold cavity;
    (5) allowing the first and second thermoplastic material to solidify in the mold cavity and runner passage; and
    (6) opening the mold portions and separating a molded part formed in the mold cavity from a runner formed in the runner passage.

2. The method of claim 1 wherein the entire runner passage extends along the part line.

3. The method of claim 1 wherein the first separate section of the runner passage extends along the part line and the second separate section of the runner passage extends perpendicularly to the part line.

4. The method of claim 1 including the step of maintaining the first injection nozzle in position against the mold to block backflow of the second thermoplastic material from the first separate section of the runner passage during step (4).

5. The method of claim 1 including the step of maintaining the second injection nozzle in position against the mold to block backflow of the first thermoplastic material from the second runner passage during step (3).

6. A mold for sandwich molding of parts of a first and second thermoplastic material, the mold comprising:

a first and second mold portion interfitting at a part line to form a mold, each mold portion defining both the mold cavity and an unheated branched runner passage free from valves, the branched runner passage having a common section and first and second separate sections, wherein the common section and at least one of the separate sections of the runner passage extend from the cavity to the outside of the mold portion entirely along the part line;

whereby sequential injections of a first and second thermoplastic material may be made into the mold cavity through the first and second separate portions of the runner passage with the second thermoplastic material expanding within the first thermoplastic material.

7. The mold of claim 6 wherein the entire runner passage extends along the part line.

8. The mold of claim 6 wherein one branch of the runner passage extends along the part line and a second branch of the runner extends perpendicularly to the part line.

* * * * *